April 1, 1958 J. W. TOOKE 2,828,858
PACKAGE FOR DRY MIX PRODUCTS
Filed Jan. 31, 1955

INVENTOR
JAMES W. TOOKE
BY
ATTORNEY

United States Patent Office 2,828,858
Patented Apr. 1, 1958

2,828,858
PACKAGE FOR DRY MIX PRODUCTS
James W. Tooke, Bartlesville, Okla.
Application January 31, 1955, Serial No. 484,871
3 Claims. (Cl. 206—47)

This invention relates to an improved package which may be used as a container for the purpose of merchandising dry mix products of the type requiring admixture with a liquid for further processing and in addition as the vessel for the mixing operation.

Examples of dry mix products requiring admixture with a liquid for further processing include cake mixes, pie crust mixes, pancake mixes and the like as well as paints, plaster of Paris and cement mixes. In order to mix such products with a liquid, the usual form of package necessitates emptying the dry mix products into a suitable mixing container, direct or increment addition of the required amount of liquid to the mixing container, and mixing by stirring or agitating with some form of a mixing implement. After complete mixing, the mixture is usually transferred to another container in which it may be cooked or otherwise processed. This method of mixing requires the use of a mixing vessel and a mixing implement for proper mixing and as a result imposes a washing or cleaning operation prior to reuse of the mixing utensils.

Accordingly it is a principal object of the present invention to provide an improved package for dry mix products which will eliminate the need for a mixing vessel and implement and as a result eliminate subsequent washing or cleaning operations.

Another object of the present invention is to provide a package not only suitable for merchandising a dry mix preparation but also suitable for use in mixing the dry mix contents with a liquid.

Another object of the present invention is to provide a dry mix package which is not only suitable for use in mixing the dry mix contents with a liquid but also occupies substantially the same volume when filled with the dry mix preparation as does the usual package employed for the sole purpose of merchandising such mixes.

These and other objects of the present invention will become more apparent upon considering the following description with the accompanying drawing wherein.

Figure 1:
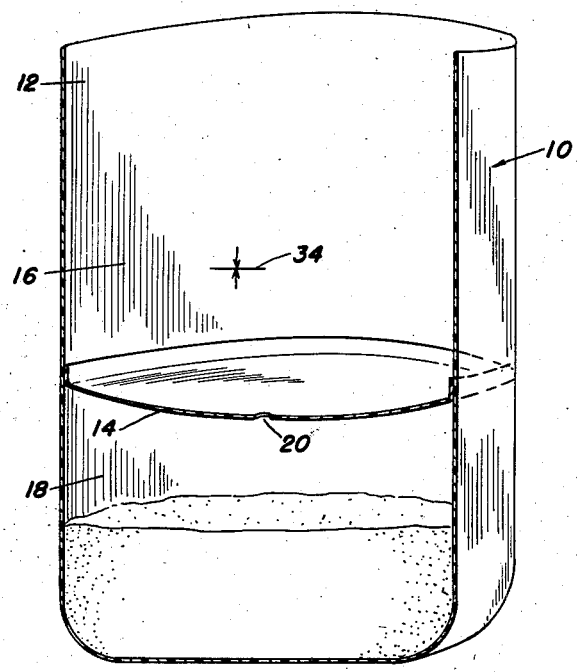
Figure 1 is a side elevational view in section illustrating the package for dry mix products of the present invention in a fully open position and including the dry mix product in the lower compartment thereof.

The dry mix package of the present invention comprises a container of pliable, substantially liquid impervious material which is open at the upper end and divided into upper and lower compartments by a partition. The partition is also of pliable substantially liquid impervious material and has an aperture therein which establishes a passage for the flow of liquid from the upper to the lower compartment. The volume of the lower compartment is greater than the combined volumes of the dry mix product to be packed in the lower compartment and of the liquid to be subsequently mixed therewith. In a preferred embodiment, a normally closed, unidirectional, valve member is associated with the aperture for the purpose of permitting controlled liquid flow only from the upper to the lower compartment. It is also preferred that the volume of the upper compartment be such that the quantity of liquid to be admixed with the dry mix content of the package may be added to the upper compartment and still leave sufficient unoccupied volume in the upper compartment to permit the side walls of the container to be brought together and rolled or folded for the purpose of exerting sufficient pressure to force the liquid quickly through the aperture and into the lower compartment.

More specifically and with reference to the drawing, the dry mix package comprises a container 10 of pliable, substantially liquid impervious material which is open at the upper end 12. Examples of suitable, pliable, substantially liquid impervious materials include waxed or other water-proofed paper, plastic films, metal foils, etc. Preferably the container is in the form of a bag or sack, this construction permitting a gathering together of the side walls for the purpose of sealing the open end of the package. A partition 14 divides the container 10 into upper and lower compartments 16 and 18, respectively. The partition member 14 is also made from a pliable, substantially liquid impervious material which may be the same material as the material of construction of the container itself. The partition 14 may be fixed to the side walls of the container 10 by any suitable means which will establish a liquid proof joint. For example, in the case of a container and partition of "Pliofilm" (a rubber hydrochloride product) and as shown in the drawings, a seal or joint may be formed by heat and pressure.

In order to permit liquid flow from the upper to the lower compartment, an aperture 20 is formed in the partition 14. For reasons explained more fully hereinafter, the size of the aperture 20 is of a constricted nature. For example, in the case of a container of 6 inch diameter, the aperture would be of the order of from ⅛ to ½ inch diameter, the preferred diameter being determined by the viscosity of the liquid to be mixed with the dry mix content of the package.

Figure 4:
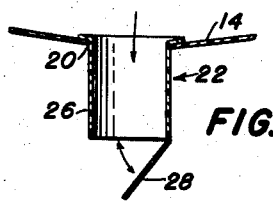
Figure 4 is a partial side elevational view in section illustrating a further embodiment of the package for dry mix products of the present invention and including a unidirectional valve member associated with the aperture of the partition member.
Figure 5:
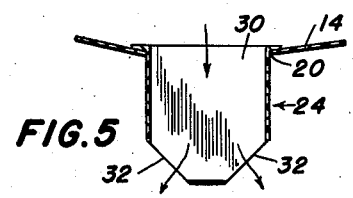
Figure 5 is a view similar to Figure 4 but including another form of valve member.

A preferred embodiment of the present invention, such as 22 of Figure 4 or 24 of Figure 5, includes a valve associated with the aperture 20. Preferably this valve member is of the type which permits liquid flow in but one direction, i. e., from the upper to the lower compartment. Once the liquid is added to the upper compartment and forced through the valve means, this arrangement positively prevents escape of liquid or admixed product into the upper compartment.

The particular form of the valve 22 shown in Figure 4 includes a conduit 26 fastened at one end to the partition 14 and registering with the aperture 20. At the other end of the conduit 26 there is provided a valve flap 28 which may be of the same material as the conduit 26 and integral therewith. By this arrangement, liquid may be forced from the upper to the lower compartment but the valve flap 28 will seat itself against the lower end of the conduit 26 to prevent flow in the opposite direction.

The form of valve 24 shown in Figure 5 includes a double walled member of elastic material such as rubber with an inlet opening 30 in registry with the aperture 20 and two normally closed outlet means 32 leading to the lower compartment. The nature of the elastic material of construction of this valve is such that it permits the outlet openings 32 to open when pressure is exerted by liquid from the upper compartment but prevents a reverse direction of passage of liquid.

Figure 2:
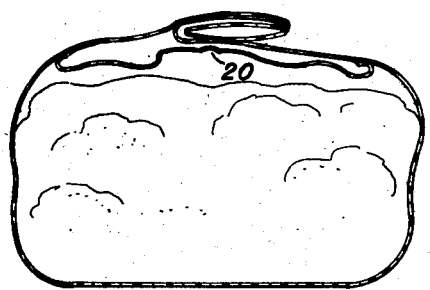
Figure 2 is a side elevational view in section illustrating the package for dry mix products of the present invention in a folded position for kneading and including a kneaded mixture of dry mix product and liquid in the lower compartment thereof.

It is an essential feature of the dry mix package 10 that the volume of the lower compartment 18 be greater than the combined volumes of the dry mix product to be packaged in the container and of the liquid which is to be added to the dry mix product volume for further processing. For example, in the case of admixing two volumes of wheat flour with two volumes of water, approximately three volumes of mixture are obtained. Therefore, the volume of lower compartment 18 containing two volumes of wheat flour packaged therein should be greater than three volumes and preferably at least four volumes. Upon addition of the liquid to the upper compartment 16 and passage of the same through aperture 20 and as shown in Figure 2, the liquid and dry mix product are then intimately admixed by kneading the bag. With sufficient unoccupied volume in the lower compartment, kneading will obtain the required intimate admixture without necessity of the use of a mixing implement or additional vessel. After the mixing operation is complete, the contents of the lower compartment are emptied into whatever form of container is needed for further processing. This can be accomplished by slitting the side wall or bottom of the lower compartment 18 and allowing the mixture to pour directly into the selected container. After this has been done, the emptied package is discarded.

It is a preferred feature of the present invention that the volume of the upper compartment 16 be greater than the volume of liquid to be added to the dry mix contents of compartment 18. Sufficient excess volume will permit the open end of the container to be closed by folding or rolling. Upon further folding or rolling liquid in the upper compartment is forced through the aperture 20 into the lower compartment. By this arrangement the entire liquid content to be admixed with the dry contents of the lower compartment may be added to the upper compartment at one time and forced through aperture 20 in increments as needed. If the volume of the upper compartment is less than this, several additions of liquid to the upper compartment would be required. Indicia, such as 34, may be included on the side wall of the upper compartment to indicate the proper measure of liquid to be added to the dry mix content of the lower compartment. In the event that a valve is not associated with aperture 20, the fact that the aperture is of a constricted nature and is blocked by resting on the dry mix content contained in the lower compartment will allow the addition of liquid up to the indicia marking level. After the liquid has reached the lower compartment by the folding or rolling operation described, no substantial liquid or admixed product will escape to the upper compartment during the kneading operation if the side walls of the upper compartment have been sufficiently folded or rolled so as to come in contact with the aperture and thereby block the same. In the preferred modification in which a valve is associated with the aperture, the unidirectional flow of liquid permitted by the valve will prevent the escape of liquid and/or mixture into the upper compartment during the kneading operation.

Figure 3:
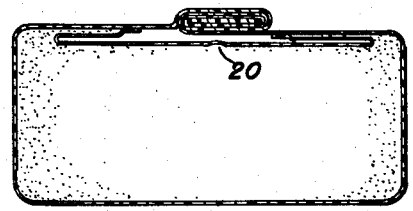
Figure 3 is a side elevational view in section illustrating the package for dry mix products of the present invention in a folded position for shipping and merchandising the dry mix contents thereof.

By reason of the construction of the above described package 10 and as shown in Figure 3 of the drawing, the portion of the container which does not contain the dry mix product may be completely folded or rolled up so that the total volume occupied by the package containing the dry mix product is substantially no more than the volume occupied by a plain package adapted for merchandising only. Thus the package occupies no more shipping or counter space than required for the usual package. Of course the package may, if desired, be inserted in a cardboard container for mechandising.

The foregoing description of the present invention is for the purpose of illustration and is not limiting to the scope thereof which is set forth in the claims.

I claim:

1. A package for dry mix products comprising a sack of pliable, substantially liquid impervious material open at the upper end, the sack being divided into upper and lower compartments and having an aperture communicating between the compartments to provide a passage for the flow of liquid from the upper to the lower compartment, a quantity of dry mix product in the lower compartment, and a unidirectional valve member connected with the sack adjacent the aperture to prevent flow of liquid and dry mix product from the lower compartment through the aperture, the volume of the lower compartment being at least as great as the combined volumes of the dry mix product therein and the liquid to be admixed therewith.

2. The invention of claim 1, the volume of the upper compartment being greater than the volume of the liquid to be admixed with the dry mix content of the lower compartment and sufficient to allow the open end of the container to be closed upon itself.

3. The invention of claim 1, the valve member comprising a thin pliable sleeve, the walls of the sleeve being normally collapsed in sealing relationship and expansible by fluid pressure in the upper compartment acting downwardly thereon at least in the vicinity of the aperture thereby permitting fluid to flow from the upper to the lower compartment.

References Cited in the file of this patent

UNITED STATES PATENTS

| | | |
|---|---|---|
| 766,587 | Bradshaw | Aug. 2, 1904 |
| 1,158,349 | Whalen | Oct. 26, 1915 |
| 1,644,821 | Eckart | Oct. 11, 1927 |
| 1,809,259 | Williams | June 9, 1931 |
| 1,885,757 | Orlopp | Nov. 1, 1932 |
| 2,112,406 | Metro | Mar. 29, 1938 |
| 2,387,978 | Casey | Oct. 30, 1945 |
| 2,487,236 | Greenberg | Nov. 8, 1949 |
| 2,605,896 | Rohdin | Aug. 5, 1952 |
| 2,682,902 | Metzger | July 6, 1954 |